US012633870B2

(12) United States Patent
Shen et al.

(10) Patent No.: US 12,633,870 B2
(45) Date of Patent: May 19, 2026

(54) PORTABLE PHOTOVOLTAIC ARRAY GENERATOR SET CONTAINER AND UTILIZATION METHOD THEREOF

(71) Applicant: SENTA ENERGY CO., LTD, Jiangsu (CN)

(72) Inventors: Xiaobo Shen, Jiangsu (CN); Mingliang Ding, Jiangsu (CN); Rui Jiang, Jiangsu (CN); Xuan Hua, Jiangsu (CN)

(73) Assignee: SENTA ENERGY CO., LTD, Jiangsu (CN)

( * ) Notice: Subject to any disclaimer, the term of this patent is extended or adjusted under 35 U.S.C. 154(b) by 0 days.

(21) Appl. No.: 18/727,153

(22) PCT Filed: Jun. 30, 2023

(86) PCT No.: PCT/CN2023/105156
§ 371 (c)(1),
(2) Date: Jul. 8, 2024

(87) PCT Pub. No.: WO2024/119807
PCT Pub. Date: Jun. 13, 2024

(65) Prior Publication Data
US 2025/0088143 A1 Mar. 13, 2025

(30) Foreign Application Priority Data

Dec. 8, 2022 (CN) .......................... 202211587313.2

(51) Int. Cl.
*H02S 30/20* (2014.01)
*H02S 10/40* (2014.01)
(52) U.S. Cl.
CPC .............. *H02S 30/20* (2014.12); *H02S 10/40* (2014.12)

(58) Field of Classification Search
None
See application file for complete search history.

(56) References Cited

U.S. PATENT DOCUMENTS

2013/0186450 A1 7/2013 Smith et al.

FOREIGN PATENT DOCUMENTS

| CN | 107027335 | A | 8/2017 |
| CN | 109510571 | A | 3/2019 |
| CN | 110601653 | A | 12/2019 |
| CN | 115800898 | A | 3/2023 |
| WO | 2020229783 | A1 | 11/2020 |

OTHER PUBLICATIONS

International Search Report for PCT/CN2023/105156 mailed on Sep. 29, 2023, 4 pages.
Office Action issued in related CN Application No. 202211587313.2 mailed on Aug. 25, 2023, 9 pages.

*Primary Examiner* — Dustin Q Dam
(74) *Attorney, Agent, or Firm* — Dinsmore & Shohl LLP

(57) ABSTRACT

A portable solar photovoltaic array power generator set container and a usage method thereof are provided. The portable solar photovoltaic array power generator set container includes a foldable solar photovoltaic power generation unit, a rail component for the foldable solar photovoltaic power generation unit to unfold and retract, electrical equipment and a container. The foldable solar photovoltaic power generation unit includes multiple frames, multiple solar photovoltaic components, a hinge component and a movable component. The foldable solar photovoltaic power generation unit further includes a position-limiting component for limiting an unfolding angle of each set of frames.

12 Claims, 11 Drawing Sheets

11

Hybrid grid

On-grid

Off-grid

Unfolding

Transportation

PORTABLE PHOTOVOLTAIC ARRAY GENERATOR SET CONTAINER AND UTILIZATION METHOD THEREOF

CROSS-REFERENCE TO RELATED APPLICATIONS

This application is a U.S. National Phase of International Patent Application No. PCT/CN2023/105156, entitled "PORTABLE PHOTOVOLTAIC ARRAY GENERATOR SET CONTAINER AND UTILIZATION METHOD THEREOF" and filed on Jun. 30, 2023, which claims priority to Chinese Patent Application No. 202211587313.2 filed Dec. 8, 2022, the entire contents of each are incorporated herein by reference in their respective entireties.

This application claims priority to Chinese Patent Application No. 202211587313.2 filed with the China National Intellectual Property Administration (CNIPA) on Dec. 8, 2022, the content of which is incorporated herein by reference in its entirety.

TECHNICAL FIELD

The present disclosure relates to solar photovoltaic power generation and lithium battery storage energy units, for example, to a portable solar photovoltaic array power generator set container and a usage method thereof.

BACKGROUND

At present, new energy forms include solar power generation, hydroelectric power generation, biological energy power generation, wind power generation, etc. Among various energy technology routes, solar photovoltaic power generation has obvious advantages in cost.

The current solar power generation systems are mainly divided into ground solar photovoltaic power stations and distributed solar photovoltaic power stations. These stationary power stations, though generating considerable electricity, have quite a lot of inherent deficiencies, for example, large land area required, long construction period, high labor cost, and inability to quickly move to locations in urgent need of electricity due to fixed sites. In order to solve the problems existed in the above traditional power stations, it is in urgent demand for a foldable portable solar photovoltaic array power generator set container that can achieve advantages such as portability, fast laying, small land area occupied.

SUMMARY

In order to solve the problems of the above-described background technology, a portable solar photovoltaic array power generator set container and a usage method thereof are provided according to the present disclosure.

A portable solar photovoltaic array power generator set container is provided according to an embodiment of the present disclosure, which includes a container, foldable solar photovoltaic power generation unit capable of being packed inside the container, a rail component for the foldable solar photovoltaic power generation unit to move, and electrical equipment.

The foldable solar photovoltaic power generation unit includes multiple frames, multiple solar photovoltaic components fixed in each of the frames, a hinge component and a movable component. One set of frames are formed by every two frames, the hinge component is connected to upper ends of one set of frames where the frames are connected, to enable the one set of frames to be folded. The movable component is arranged at a lower end of each of two sides of the one set of frames, movable component is foldable with another set of frames, and the movable component moves along the rail component. The foldable solar photovoltaic power generation unit further includes a position-limiting component for limiting an unfolding angle of each set of frames.

An operation method for unfolding a foldable portable solar photovoltaic array power generator set container is further provided according to an embodiment of the present disclosure, the method includes the following operations.

A container is placed in a designated site after being transported.

A door of the container is opened, two lower latch square tubulars at a lower part of the foldable solar photovoltaic power generation unit are taken out and placed below the folded solar photovoltaic power generation unit. The two lower latch square tubulars are synchronously jacked by using four jacks to take out four battens, to allow a caster of the foldable solar photovoltaic power generation unit to fall on a lower track. A rail component in the container is laid outwards, a transfer track is laid first, and then track racks and tracks are laid.

A latch for fixing the foldable solar photovoltaic power generation unit is drawn out, and the foldable solar photovoltaic power generation unit is unfolded.

Folded frames are pulled out, to allow an angle limiting steel cable to limit an angle of the folded frames with respect to the track to 15 degrees.

After the folded solar photovoltaic power generation unit is unfolded in place, blocking plates are mounted to head and tail ends of the rail component respectively, to limit positions of two sets of frames at the head and tail ends.

The transfer track near the container is removed.

S-shaped fixing hooks are mounted to fix the two sets of frames at the head and tail ends.

A cover plate of a wire hole is removed, and power cables of the foldable solar photovoltaic power generation unit are passed through the wire hole and the power cables are connected to inverters.

Each switch of electrical equipment is turned on, the door of the container is closed after power generation is performed normally, and the installation ends.

A method for packing and transferring a portable solar photovoltaic array power generator set container is further provided according to an embodiment of the present disclosure. The method includes the following operations.

A door of the container is opened, each switch of electrical equipment is turned off, power cables by which the foldable solar photovoltaic power generation unit is connected to inverters are disconnected and pulled out, and the power cables are drawn out from a wire hole.

A cover plate of the wire hole is mounted in a side door of the container, and a transfer track is used to connect a track to the container.

Sleeve traction tubes are inserted into frames and a traction steel wire rope is installed.

An electric winch is started, the frames are packed into the container, an upper pin is inserted to fix and limit the position.

Pearl cotton is laid on front, left and right sides of the foldable solar photovoltaic power generation unit, and three tightening bandages are tied on the foldable solar photovoltaic power generation unit to tighten the foldable solar photovoltaic power generation unit.

Two lower latch square tubulars are placed below the foldable solar photovoltaic power generation unit, and four jacks are used to contact the two lower latch square tubulars to jack up the foldable solar photovoltaic power generation unit. Four battens are placed evenly below the foldable solar photovoltaic power generation unit. Specifically, two of the four battens are respectively placed at two sides of the foldable solar photovoltaic power generation unit. The jacks are lowered to allow the foldable solar photovoltaic power generation unit to press onto the four battens. Two lower latch square tubulars are inserted into squares at a lower part of lateral sides of the frames by bolts.

A disassembled rail component is packed into the container and the disassembled rail component is fixed.

After the door of the container is closed, the container is packed and transferred by a truck mounted crane.

Figure 1:
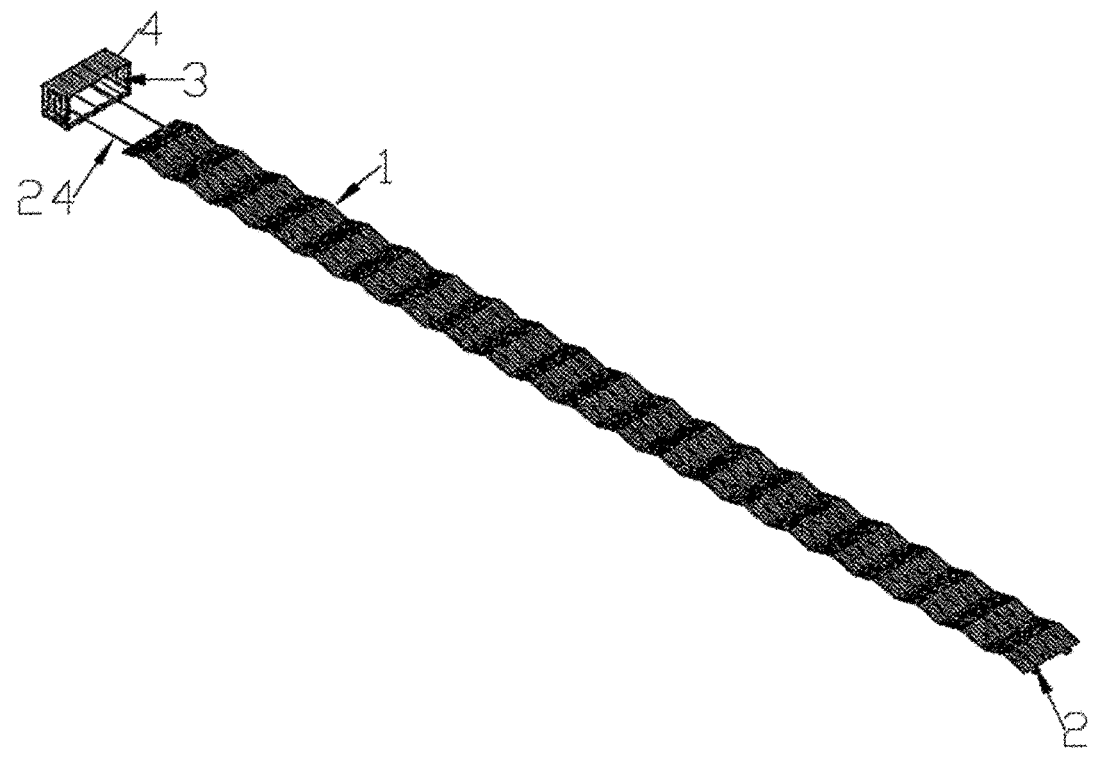
FIG. 1 is a schematic diagram showing a portable solar photovoltaic array power generator set container in an unfolded state according to an embodiment of the present disclosure.

REFERENCE NUMERALS foldable solar photovoltaic power generation unit;
2. rail component;
3. electrical equipment;
4. container;
11. frame;

12. position-limiting component;
13. solar photovoltaic component;
14. hinge component;
15. movable component;
16. stringer;
17, component mounting position;
21, track;
22. track rack;
23. U-shaped latch;
24. transfer track;
31. inverter;
33. energy storage battery;
33. power distribution box;
34. power cable;
41. wire holes;
42. hanger rod;
43. latch square tubular;
44. lower track;
45. wall-mounted track;
111. component mounting and fixing piece;
112. top blocking plate;
113. square tube hole;
121. angle limiting steel cable;
122. suspending steel cable;
123. pull ring;
124. position-limiting ring;
125. fixed head;
151. C-shaped large frame;
152. axle bolt;
153. caster;
154. position-limiting eye nut;
155. C-shaped small frame;
221. ground-mounted plate;
222. ground-mounted stick;
223. track rack;
224. blocking plate;
225. S-shaped fixing hook.

DETAILED DESCRIPTION

The present disclosure is described hereinafter with reference to the drawings.

This embodiment is simply an interpretation of the present disclosure. After reading the Description, the technical personnel in the art can make modifications as required without making creative contributions to the embodiment, however these modifications are all subjected to the protection of Patent law as long as falling into the scope of Claims.

In the description of the present disclosure, it is to understand that the directional and positional relationships indicated by terms such as "center", "vertical", "horizontal", "length", "width", "thickness", "up", "down", "front", "rear", "left", "right", "vertical", "horizontal", "top", "bottom", "inner", "outer", "clockwise", "counterclockwise", "axial", "radial", "circumferential" are directional or positional relationships shown based on the drawings, just to facilitate describing the present disclosure and simplifying the description, rather than indicating or suggesting that the devices or elements indicated must have a specific orientation, or be configured and operated in a specific orientation.

In addition, the terms "first" and "second" are only used to describe the purpose, and cannot be understood as indicating or implicating relative importance, or implicating or indicating the number of the indicated technical features. As a result, the features defined with "first" and "second" can explicitly or implicitly include one or more of the features.

In the description of the present disclosure, the meaning of "multiple" is two or more, unless otherwise expressly specifically limited.

In the description of the present disclosure, unless otherwise expressly specified and limited, the terms "mounting", "connected to each other", "connected", "fixing" are to be construed in a broad sense, for example, as permanently connected or detachably connected or integrally connected; mechanically connected or electrically connected; directly connected to each other or indirectly connected to each other via an intermediary; or internally connection of two components or interaction relationship between two components. For those of ordinary skill in the art, specific meanings of the preceding terms in the present disclosure may be construed based on specific situations.

In the present disclosure, unless otherwise expressly specified and limited, when a first feature is described as "above" or "below" a second feature, the first feature and the second feature may be in direct contact, or be in indirect contact via an intermediate medium. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Embodiments

Figure 2:
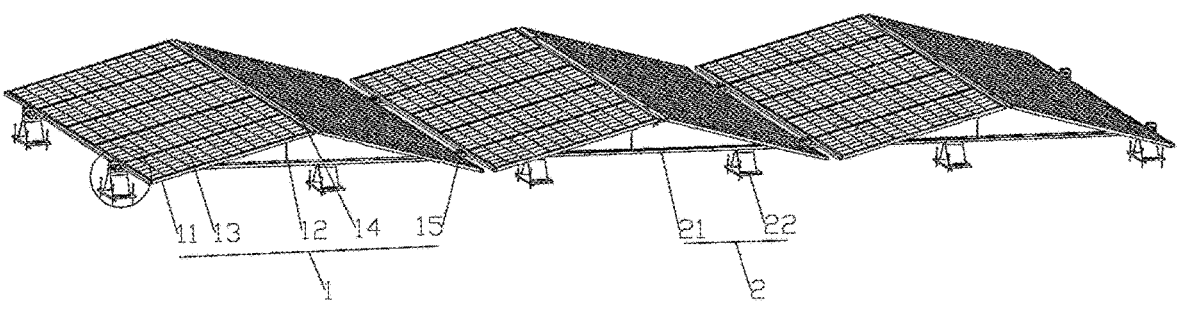
FIG. 2 is a schematic diagram of three sets of frames taken from FIG. 1.

A foldable portable solar photovoltaic array power generator set container being in an unfolded state is shown in FIG. 1, and three groups of frames taken from FIG. 1 are shown in FIG. 2. The foldable portable solar photovoltaic array power generator set container includes a foldable solar photovoltaic power generation unit 1, a rail component 2 for the foldable solar photovoltaic power generation unit 1 to travel, and electrical equipment 3. After multiple members of the rail component 2 for the foldable solar photovoltaic power generator unit 1 to travel are connected to each other, the foldable solar photovoltaic power generator unit 1 can be folded or unfolded with the assistance of the rail component 2, and can generate power when being unfolded as shown in FIG. 1, and can be packed after being folded.

As shown in FIG. 2, the foldable solar photovoltaic power generation unit 1 includes multiple frames 11, multiple solar photovoltaic components 13 fixed in each of the frames 11, a hinge component 14 and a movable component 15.

One set of frame are formed by every two frames 11, one set of frames 11 form an inverted V shape, and multiple inverted V-shapes are connected together to form the entire foldable portable solar photovoltaic array power generation assembly. The hinge component 14 is connected to upper ends of one set of frames 11 where the frames are connected, to enable the one set of frames 11 to be folded by adjusting an opening of the inverted V-shape. The movable component 15 is arranged at a lower end of each of two sides of a set of frames 11, can be folded with another set of frames 11, and the movable component 15 moves along the rail component 2, to facilitate providing assistance in folding.

Figure 3:
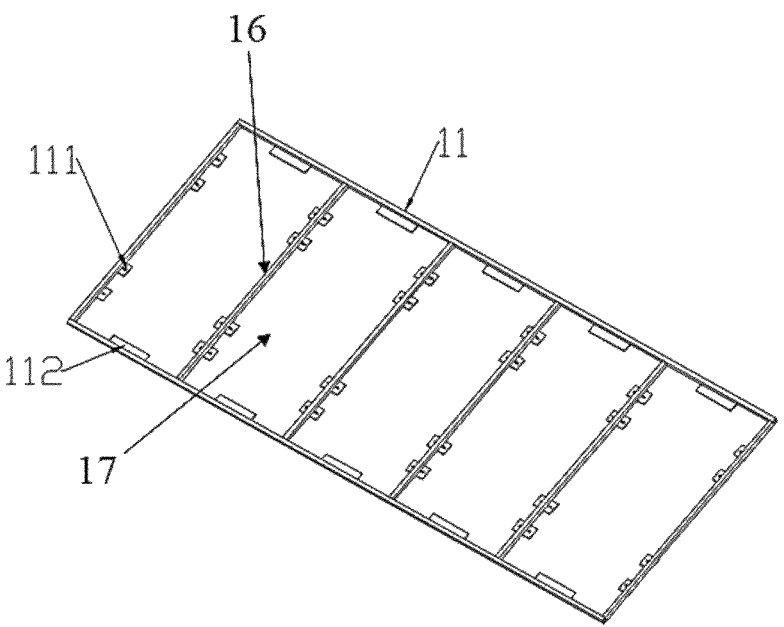
FIG. 3 is a schematic diagram of a single piece of frame.

FIG. 3 is a schematic diagram of a frame 11. The frame 11 is provided with multiple stringers 16 to divide one frame 11 into multiple component mounting positions 17. Each component mounting position 17 is provided with a top blocking plate 112 and a component mounting and fixing piece 111, and solar photovoltaic components 13 are fixed to the top blocking plate 112 and the component mounting and fixing piece 111 by bolts. That is, one frame 11 correspondingly installs multiple solar photovoltaic components 13, to allow the light irradiated area to be larger and the power of electricity generated to be higher. The frame 11 is welded into a character "囲" shape. Each sub-square frame is just the component mounting position 17, and component mounting pieces are welded around the edge of the frame 11, components are placed in the frame 11 and are connected to the component mounting piece through bolts, and mounting holes are configured to be waist shaped holes to avoid to the greatest extent mounting issues caused by errors.

Figure 4:
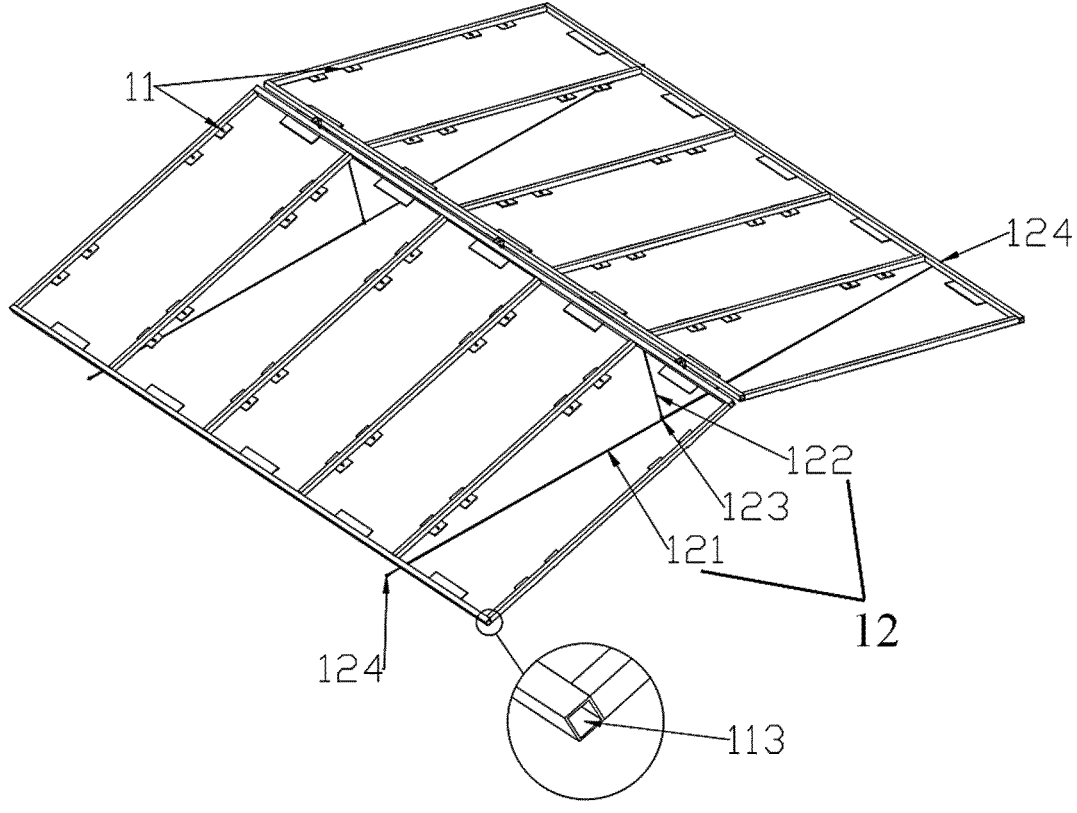
FIG. 4 is a schematic diagram of a single set of frames.

FIG. 4 is a schematic diagram of an inverted V shape formed by one set of frames 11, and the foldable solar photovoltaic power generation unit 1 further includes a position-limiting component 12 for restricting an unfolding angle of each set of frames 11, and a mounting position of the position-limiting component 12 can also be seen from FIG. 4.

Figure 5:
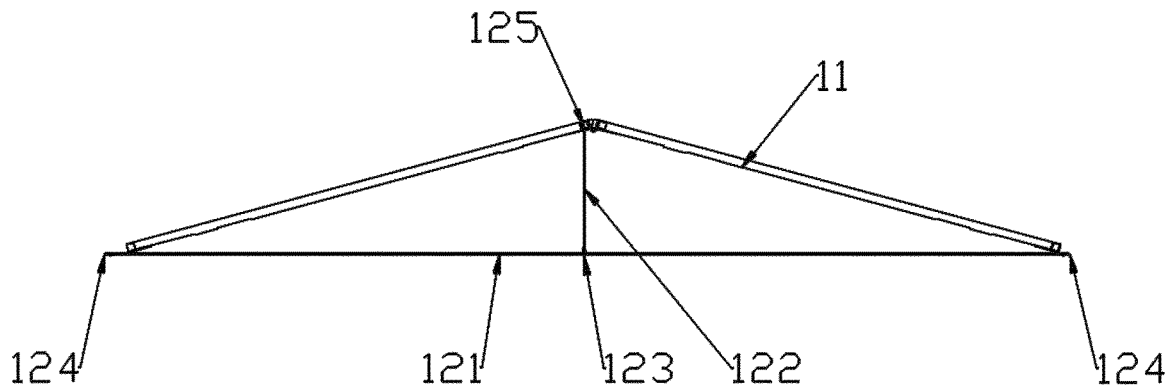
FIG. 5 is a side view of a single set of frames.

With reference to FIG. 5, the position-limiting component 12 includes an angle limiting steel cable 121, each of two ends of the angle limiting steel cable 121 is provided with a position-limiting ring 124, the movable component 15 is provided with a position-limiting eye nut 154 (shown in FIG. 6), and the two position-limiting rings 124 are fixed to the two position-limiting eye nuts 154 of one set of frames 11, respectively, to limit an unfolding angle of the one set of frames 11.

Illustratively, one lower end of the inverted V-shaped frames 11 is provided with two movable components 15, and the two movable components 15 travel on two tracks 21 respectively, the other lower end of the inverted V-shaped frames 11 is also provided with two movable components 15, and the two movable components 15 travel on two tracks 21 respectively. Each of the movable components 15 is provided with one position-limiting eye nut 154, and two position-limiting rings 124 of the angle limiting steel cable 121 are respectively fixedly connected to two position-limiting eye nuts 154 of the movable components 15 traveling on the same track 21. With reference to FIG. 5, after one set of frames 11 are unfolded, the fixed length of the angle limiting steel cable 121 makes the unfolding angle fixed, that is, when the angle limiting steel cable 121 is completely straightened, the set of frames 11 are fully unfolded, and the length of the angle limiting steel cable 121 is set to allow angles of the frames 11 with respect to a track 21 to be 15 degrees.

In an embodiment, the position-limiting component 12 further includes a suspending steel cable 122, an upper end of the suspending steel cable 122 is provided with a fixed head 125, and the fixed head 125 is fixed to the top of a set of frames 11, for example, the fixed head 125 is fixed to the top of one frame 11. A lower end of the suspending steel cable 122 is provided with a pull ring 123, and the angle limiting steel cable 121 is arranged to pass through the pull ring 123. When to fold for packing, the opening of the V-shaped frame 11 becomes small, the fixed head 125 rises along with the top of the V shape. The suspending steel cable 122 is used to lift the middle of the angle limiting steel cable 121, to retract the angle limiting steel cable 121 synchronously, which prevents the angle limiting steel cable 121 from being entangled when folding.

A steel wire rope is used as the suspending steel cable 122, one end of the steel wire rope is a safe quick hanging buckle as the pull ring 123, and the other end of the steel wire rope is an annular squeeze head as the fixed head 125. The annular squeeze head end is fixed onto an upper part of the frame 11 by using a tapping screw, and the safe quick hanging buckle end is buckled to the angle limiting steel cable 121. When to fold for packing the frames 11, the angle limiting steel cable 121 can be folded without falling onto the ground.

Figure 6:
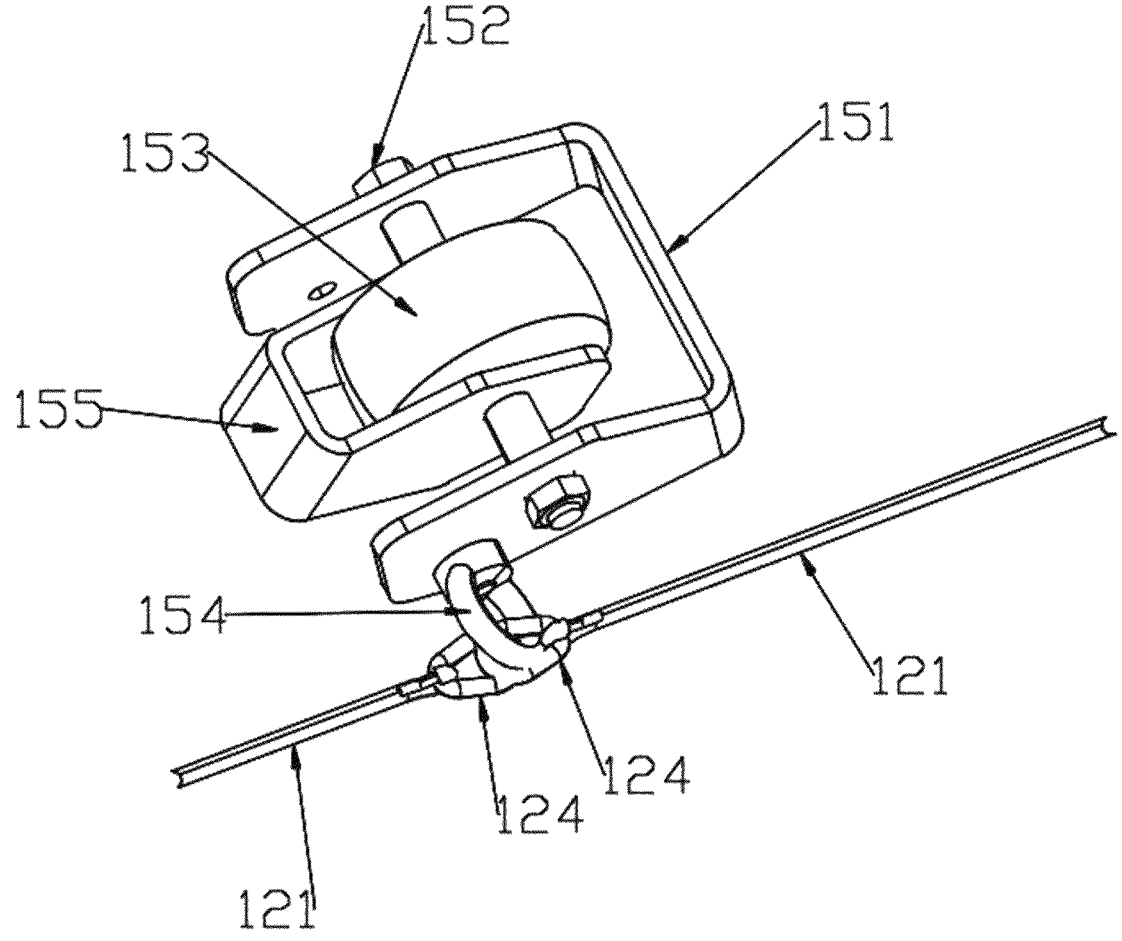
FIG. 6 is a diagram showing partially a movable component and a position-limiting component.
Figure 7:
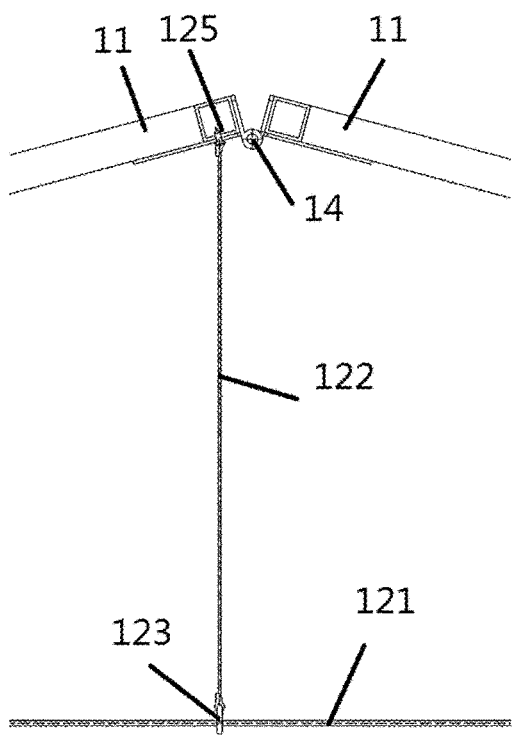
FIG. 7 is a schematic diagram showing the movable component in connection with an angle limiting steel cable.

As shown in FIG. 6, the movable component 15 includes a C-shaped large frame 151 fixedly connected to a lower end of a set of frames 11, a C-shaped small frame 155 fixedly connected to a lower end of another set of frames 11 and a caster 153. The C-shaped small frame 155 is located inside the C-shaped large frame 151, the caster 153 is located inside the C-shaped small frame 155, and an axle bolt 152 is used to connect and fix the C-shaped small frame 155, the C-shaped large frame 151 and the caster 153. A sleeve tube is mounted between the C-shaped large frame 151 and the C-shaped small frame 155 for supporting, and the position-limiting eye nut 154 is arranged at an outer side of the C-shaped large frame 151. The caster 153 is arranged on the track 21 of the rail component 2 to travel in a rolling manner. The position-limiting eye nut 154 is arranged on an outer side of the C-shaped large frame 151, for example, the position-limiting eye nut 154 can be fixed to the outer side of the C-shaped large frame 151 by means of a hexagonal bolt. The caster 153 is arranged on the track 21, a 3-inch nylon industrial caster is used as the caster 153, which can reduce friction in unfolding the folded frame 11, to make the unfolding smoothly. The movable component 15 connects both bottoms of two connected frames 11, which can not only use the caster 153 to travel, but also use the C-shaped large frame 151 and the C-shaped small frame 155 in folding the adjacent two frames 11, thereby combining the two functions into one part, saving occupied space, and shortening the distance between two frames 11.

The same position-limiting eye nut 154 connects two position-limiting rings 124 of two angle limiting steel cables 121, and is used to limit the unfolding angle of the frames 11. A steel wire rope is used as the angle limiting steel cable 121, and two ends of the steel wire rope are safe quick hanging buckles as the position-limiting rings 124. Each of the position-limiting rings 124 of the angle limiting steel cable 121 is connected to one frame 11, so that when the frames are unfolded, their end surfaces form triangles, to ensure the angle limiting of 15 degrees of the component.

In this embodiment, the hinge component 14 adopts the form of a hinge, including a first connector and a second connector. The first connector and the second connector are connected by a hinge shaft and are respectively connected to two adjacent frames 11, to achieve folding with the form of a hinge. Both the first connector and the second connector are formed by bending galvanized carbon steel, and are connected by a bolt bushing as a hinge shaft.

In this embodiment, the C-shaped large frame 151 and the C-shaped small frame 155 are welded at the bottom to serve as a caster mounting bracket for mounting the caster 153. The caster mounting bracket has a span slightly larger than the width of the track 21, and can be used as a cross position-limiter for the caster when rolling. Two frames 11 are connected into one set by the hinge, and two caster mounting brackets are welded at the bottom of each set of frames 11, a wide mounting bracket is welded to the frame 11 on one side and a narrow mounting bracket is welded to the frame 11 on the other side, and the caster 153 is mounted at the junction of head and tail ends of two sets of foldable frames 11. The 3-inch nylon industrial caster 153 is used, to form a foldable frame system, the caster 153 can reduce friction in unfolding the folded frames 11, to make the unfolding smoother.

The solar photovoltaic components 13 are placed in the component mounting position 17 in the frame 11, and are fastened by bolts.

Figure 9:
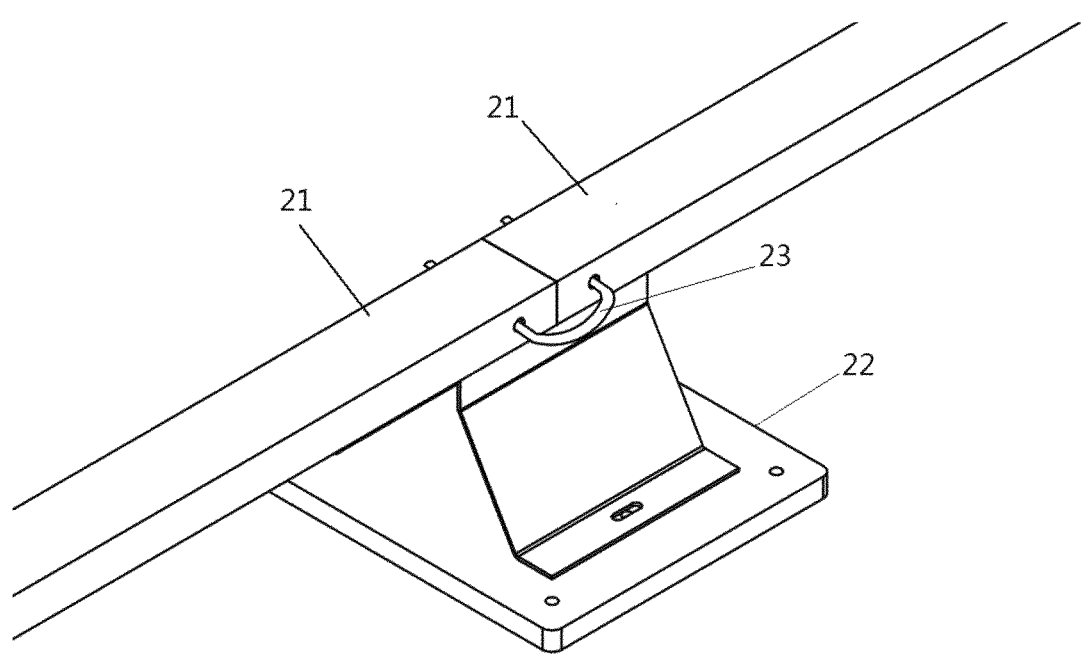
FIG. 9 is a schematic diagram showing connection of rail members.

As shown in FIG. 2, the rail component 2 includes multiple sections of tracks 21 and track racks 22 and U-shaped latches 23 (shown in FIG. 9). Every two sections of tracks 21 are fixed to the track rack 22 by the U-shaped latch 23, the movable component 15 is arranged on the track 21 to roll, and is placed in the center. The caster mounting bracket including the C-shaped large frame 151 and the C-shaped small frame 155 has position-limiting function on two sides of the track 21. Multiple sections of tracks 21 are connected to the track rack 22 by means of a U-type square clip, are fixed by bolts, and are provided with round holes at two ends. The track rack 22 is formed by bending a galvanized carbon steel plate into an "n" type.

Figure 8:
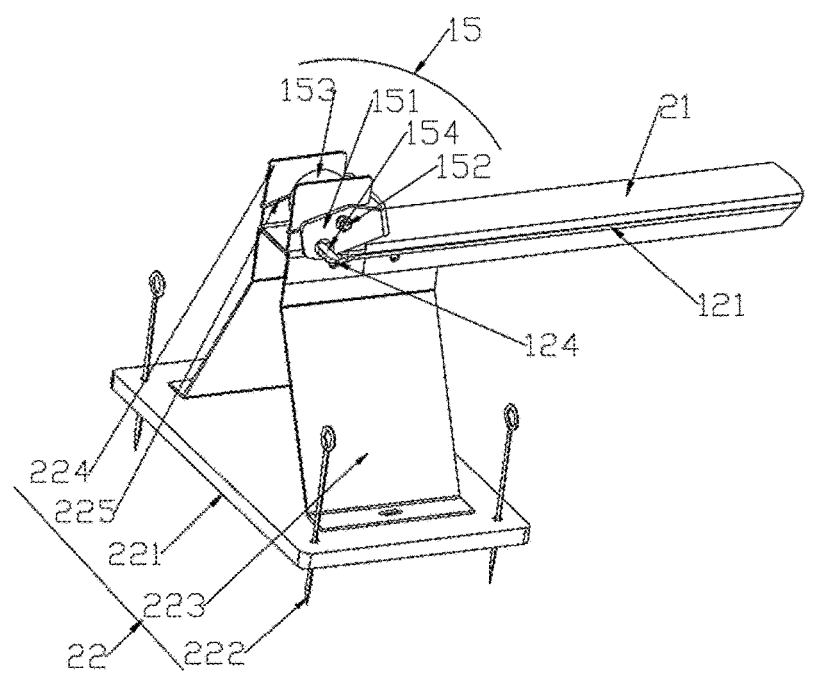
FIG. 8 is a schematic diagram showing connection of a track, a blocking plate and a track rack.

As shown in FIG. 8, the track rack 22 includes a ground-mounted plate 221, the ground-mounted plate 221 is fixed onto the ground by ground-mounted sticks 222, the ground-mounted plate 221 is connected and fixed to the track rack 223 by bolts, and the track 21 is fixed onto the track rack 223. Each of head and tail ends of the rail component 2 is provided with an axle bolt 152, a blocking plate 224 and an S-shaped fixing hook 225. For example, the blocking plate 224 can be fixed by a U-shaped latch. The caster 153 of each of two sets of frames 11 at the head and tail ends moves into the blocking plate 224, and the axle bolt 152 moves to be stuck into a stopping groove of the blocking plate 224, and a first end of the S-shaped fixing hook 225 hooks the blocking plate 224, and a second end of the S-shaped fixing hook 225 hooks the axle bolt 152, to limit and fix the positions of the frames 11 at the head and tail ends. As shown in FIG. 2, the circular region on the left side in the drawing can be a head end or a tail end. When the frames 11 are unfolded, the two sets of frames 11 at the head and tail ends are just the two sets of frames 11 on the outermost sides, and move to the positions of the blocking plates 224. The S-shaped fixing hook 225 is used to hook the axle bolt 152, so that the frames 11 on the outermost sides are fixed, thereby preventing displacement due to reasons such as environment.

Figure 10:
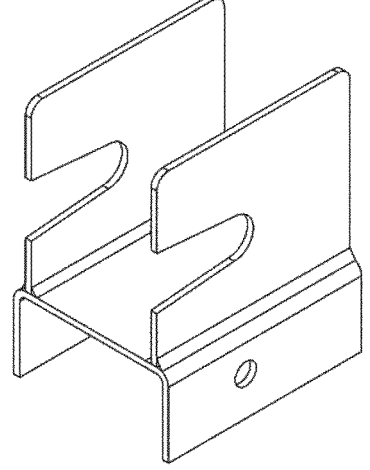
FIG. 10 is a schematic diagram showing a blocking plate in an angle of 45 degrees.

FIG. 10 is a schematic diagram showing a blocking plate 224 in an angle of 45 degrees. As shown in FIG. 10, "H" type stoppers welded with galvanized carbon steel are used at the head and tail ends of the rail component 2 to serve as blocking plates 224 for limiting the positions of the foldable frames 11 in the length direction. When unfolding the frames 11 is completed, the S-shaped fixing hooks 225 are used at two ends of the frame 11 to fix the foldable frames 11, to ensure that the frames 11 will not displace due to external factors such as weather. When the frames 11 are fully unfolded, the stoppers at the ends of the rail component 2 are used for position-limiting in the length direction. The blocking plates 224 are H-type welded components formed by welding with galvanized carbon steel, with a U-shaped opening configured in each of the blocking plates, and are fixed to ends of the rail component 2 by using the U-type square clips, and the axle nuts 152 of the two outmost foldable frame sets are stuck into the openings of the stoppers, and the S-shaped fixing hooks 225 are used to fix the positions of the foldable frame sets.

The ground-mounted plate 221 is fixed to the track rack 223 through inversely mounted countersunk bolts. The ground-mounted sticks 222 are used to fix the ground-mounted plate 221 onto the ground, and the tracks 21 are laid on the track rack 223.

Figure 11:
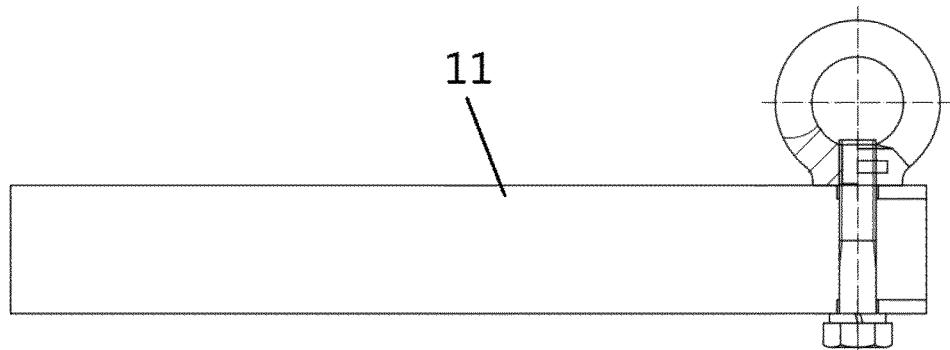
FIG. 11 is a schematic diagram of a sleeve traction tube.

Square tube holes 113 (shown in FIG. 4) are configured at upper and lower ends at an outer side of the frame 11, and a sleeve traction tube (shown in FIG. 11) may be installed in the lower square tube hole 113. An end of the sleeve traction tube is provided with an eye nut, and when the sleeve traction tube is inserted into the square tube hole 113 on the side of the frame 11, a traction steel wire rope can be mounted on the eye nut. When it is required to remove this power generation unit to another site, the sleeve traction tube is nested into the side square hole of the frame 11, the traction steel wire rope is buckled to the eye nut by the quick hanging buckle, and an electric winched is used to draw the steel wire rope, thus, the foldable component may be turned from an unfolded state to a closed state under the traction, and after the frames are fully folded, the folded frame sets are pushed back onto the rail of the container 4, reinserting a shaft pin may just fix the frames 11 with respect to the square tubes at an upper part of the container 4, and ensure the frames 11 not to slip off and release.

Figure 12:
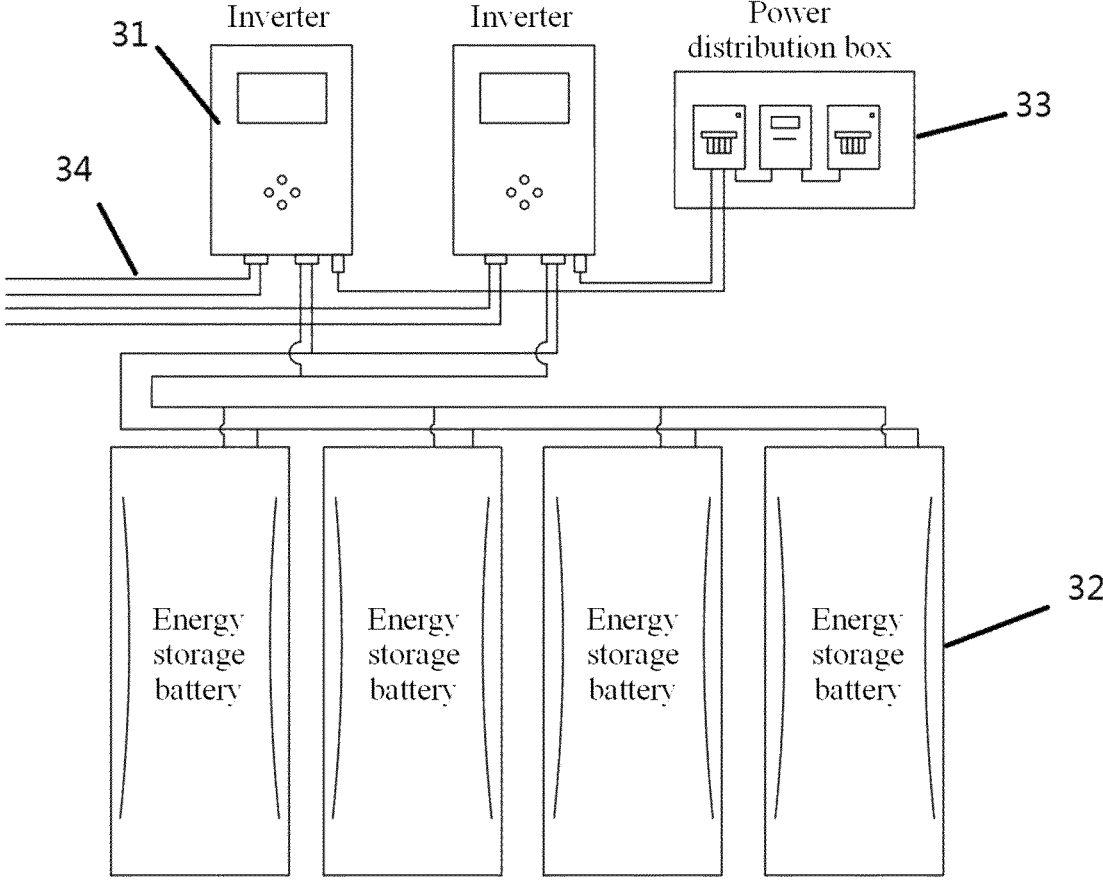
FIG. 12 is a schematic diagram showing the layout of electrical equipment.

The container 4 is equipped with a kind of foldable portable solar photovoltaic array power generator set container. Two inverters 31 are configured in the container 4. Depending on the different inclination directions of the frames 11, the foldable portable solar photovoltaic array power generation assembly can be divided into two groups, and the two groups are respectively connected to two inverters 31. The electrical equipment 3 is configured in the container 4, with reference to FIG. 12, the electrical equipment 3 includes multiple inverters 31, energy storage batteries 32, a power distribution box 33 and power cables 34. The multiple solar photovoltaic components 13, after being connected in series and in parallel by the power cables 34, are connected to the multiple inverters 31 respectively, and the energy storage batteries 32, after being connected in series and in parallel by the power cables 34, are connected to the multiple inverters 31, each of the inverters 31 is connected to the power distribution box 33 by the power cable 34, and the power distribution box 33 is connected to a load side power distribution box by an AC output cable. Finally, the electrical equipment 3 electrically connects the foldable solar photovoltaic power generator unit 1 to form a power generation circuit, and the power generation circuit is connected to the load to supply power.

Figure 13:
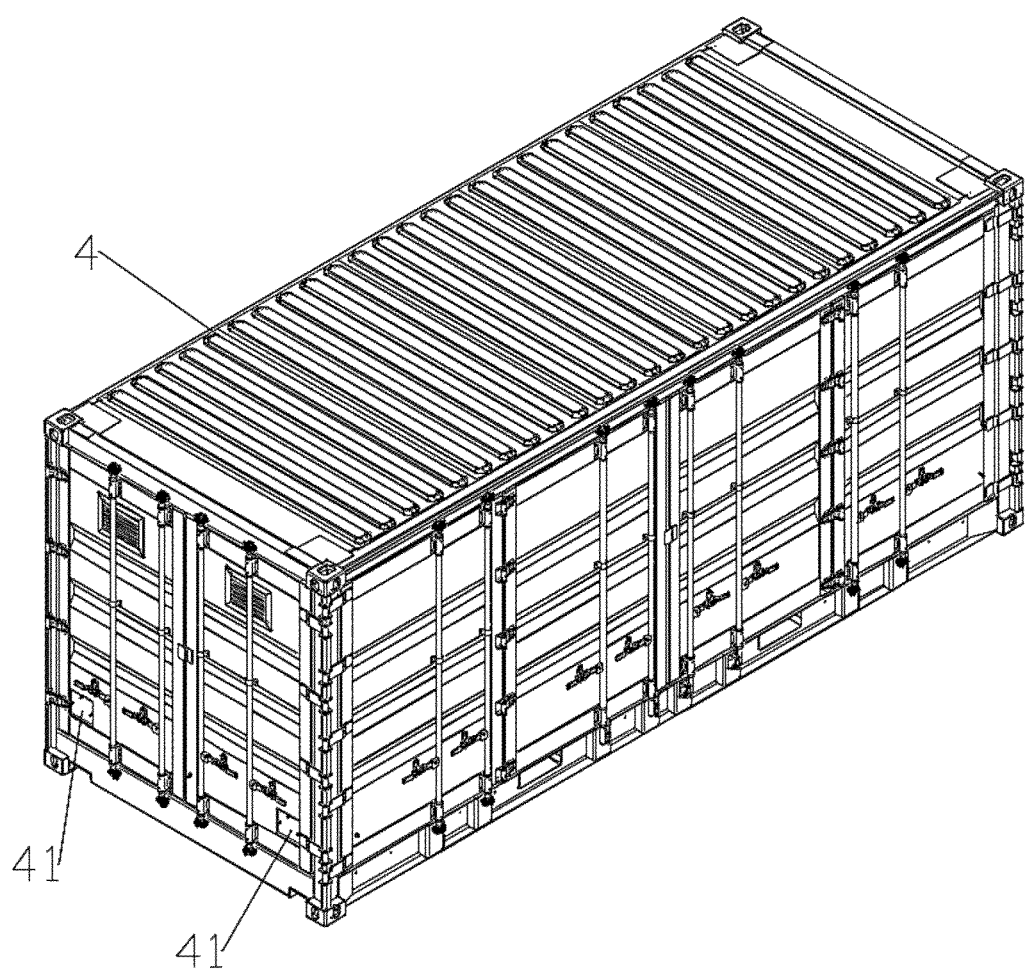
FIG. 13 is a schematic diagram showing the external of the container.
Figure 14:
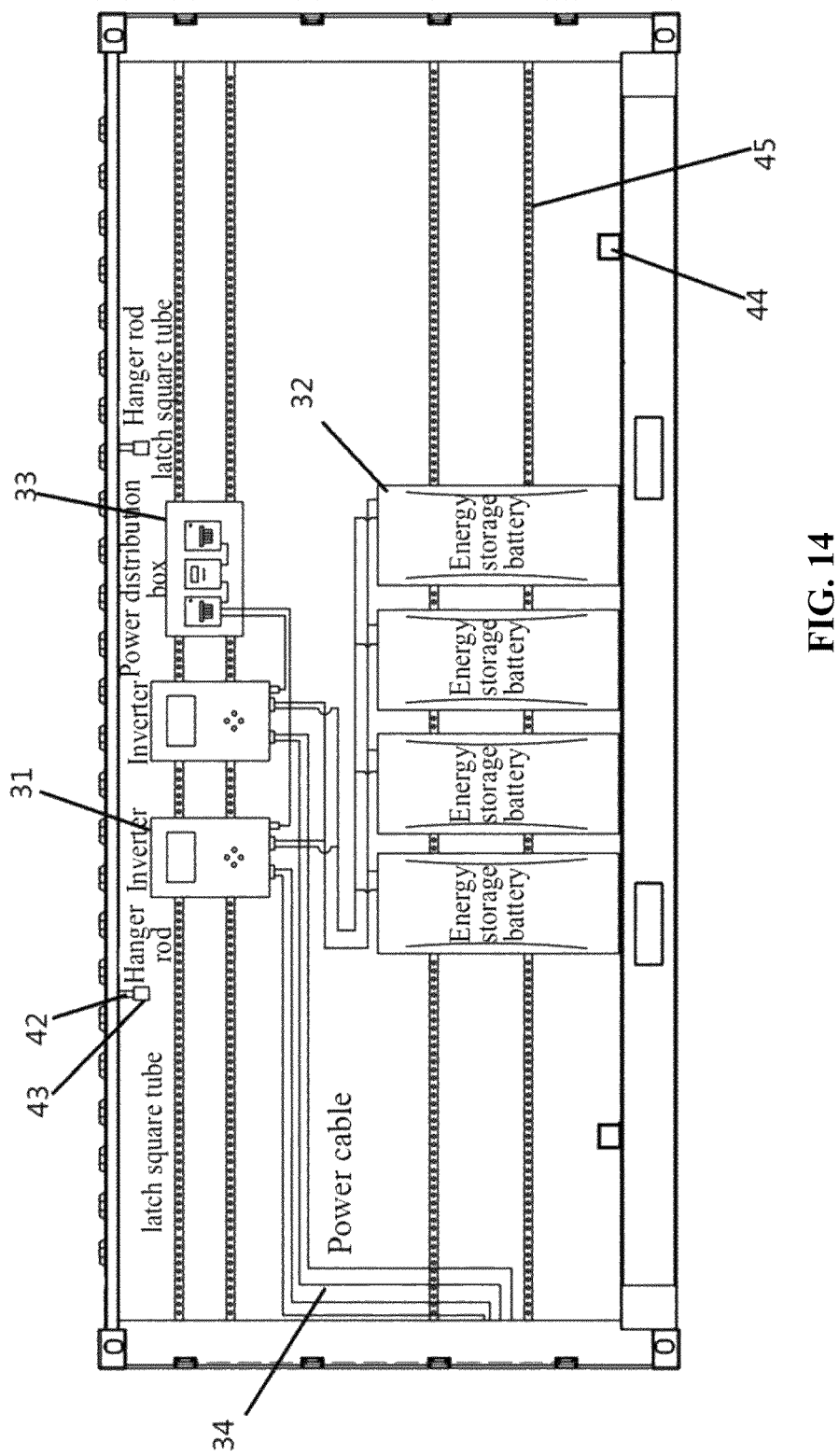
FIG. 14 is a schematic diagram showing the internal of the container.

As shown in FIG. 13, wire holes 41 are configured in a side door of the container 4. With reference to FIG. 14, the container 4 includes therein a hanger rod 42, a latch square tubular 43, a lower track 44, and a wall-mounted track 45. The hanger rod 42 and the latch square tubular 43 are welded and fixed to a top portion at an inner side of the container 4, and the lower track 44 is welded and fixed to a bottom portion at the inner side of the container 4, the wall-mounted track 45 is a porous track, and is welded and fixed onto an inner wall of the container 4.

The foldable solar photovoltaic power generation unit 1, after being folded and retracted, is pushed onto the lower track 44 inside the container 4 via a transfer track 24, and is fixed onto the latch square tubular 43 by a latch. The inverters 31, the energy storage batteries 32 and the power distribution box 33 are each mounted and fixed to the wall-mounted track 45 respectively by a latch. The power cables 34 pass through the wire hole 41 to electrically connect the multiple solar photovoltaic components 13 to the multiple inverters 31.

Two wire holes 41 correspond to two inverters 31 and the AC output cable connected to the power distribution box 33 respectively, and the connection cables connecting the foldable portable solar photovoltaic array power generation assembly to the inverters 31 pass through the wire holes 41. The wire holes 41 are provided at corners of a double door close to door rotating shaft sides, so that after the cables are connected, the opening and closing of the double door may not be interfered. The cable passing region is configured to be an internally concaved box body, and two round tubes are mounted in the box for cable passing. One side of each of the round tubes close to the inside of the box is tilted upward to prevent water from entering the container 4. A lower surface of the box body is also arranged to be titled, to prevent water from entering. A cover is arranged on an outside of the box body, and is fastened by a bolt. When in transportation, the cover is closed tightly to prevent water vapor from rusting the internal equipment. When to install the wirings, just taking off the bolt, the cover can be removed to perform wiring.

The hanger rod 42 is configured at the top of the container 4, the latch square tubular 43 is provided with a small hole, by connection of the shaft pin into the square tube hole 113 of the foldable frame 11, it is ensured the position-limiting of the upper part and the bottom of the frames 11 in the process of transportation of the frames. The rails are configured at the bottom of the container 4, the rail is provided with a notch at one side close to the door, and can be connected to the track 21, the folded frames 11, after being unfolded, move from the container 4 to the outdoor site via the track 21. The container 4 has doors at three sides, each of the doors at two short sides is a double door and the door at the long side is a four-sided foldable door. The double door is provided with a ventilated port, and an inset and rodent-prevention net is mounted at an inner side of the ventilated port. In a wall on one side, where the inverters 31 are mounted, of the container 4, the wire hole 41 is provided at a corner near the inverters 31, and a wire hole cover which can be opened and closed is provided on an outside of the wire hole 41, and when to use, the wire hole 41 is opened to facilitate wiring, and when to transport, the cover is closed to prevent water from entering. After the folded frames 11 are laid, the transfer track 24 close to the side of the container 4 is removed, and replaced by the stoppers, and the stoppers are securely mounted.

The component cables are connected to the inverters 31 inside the container 4, thus the doors of the container 4 may just be closed and the installation is finished. Jacks are used to synchronously jack up the folded frame sets, and then battens are padded at the bottom of the frames to try to ensure that the casters may not be damaged in the transportation, and finally, all the rail parts are removed and stored, and the doors of the container 4 are closed, thus, the transfer may just be performed.

Figure 15:
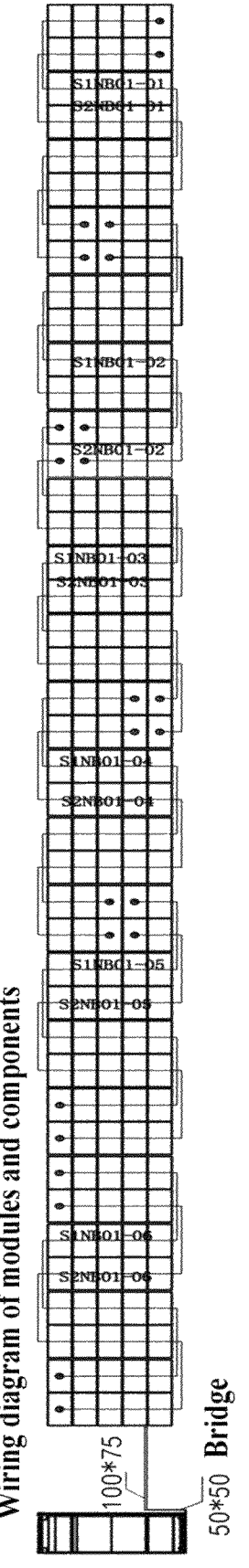
FIG. 15 is a wiring diagram showing the electrical connection of the present disclosure.

In this embodiment, the cables in the solar photovoltaic components 13 are well connected in advance, with a total of 210 pieces of solar photovoltaic components 13. The solar photovoltaic components 13 are classified, depending on different tilting directions of the racks, into two sets to be connected to two inverters 31, respectively. As shown in FIG. 15, a string of photovoltaic components have one positive pole and one negative pole. The components in the same tilting direction are connected into five groups (seventeen pieces of components connected in series in each group) and one group (twenty pieces of components connected in series in each group) and the five groups and the one group are then connected in parallel, with a positive pole obtained after the parallel connection being connected to a positive pole of the inverter 31, and a negative pole connected to a negative electrode of the inverter 31. An electric winch wiring is further provided. An emergency mobile power supply is configured in the container 4, and the emergency mobile power supply is used to supply power to the electric winch during installing and packing operations. Two 40-kilowatt (KW) inverters are selected as the inverters 31 and are installed on the double door at the end face of the container 4, and the wiring cables pass through the wire holes 41 in the double door of the container 4 to be connected to the components.

The present disclosure can work in three different modes, that is, energy storage, on-grid and off-grid. The present disclosure is not limited to on-grid power generation, can charge the energy storage container, and can also be used as an independent power supply.

Figures 16, 17, 18:
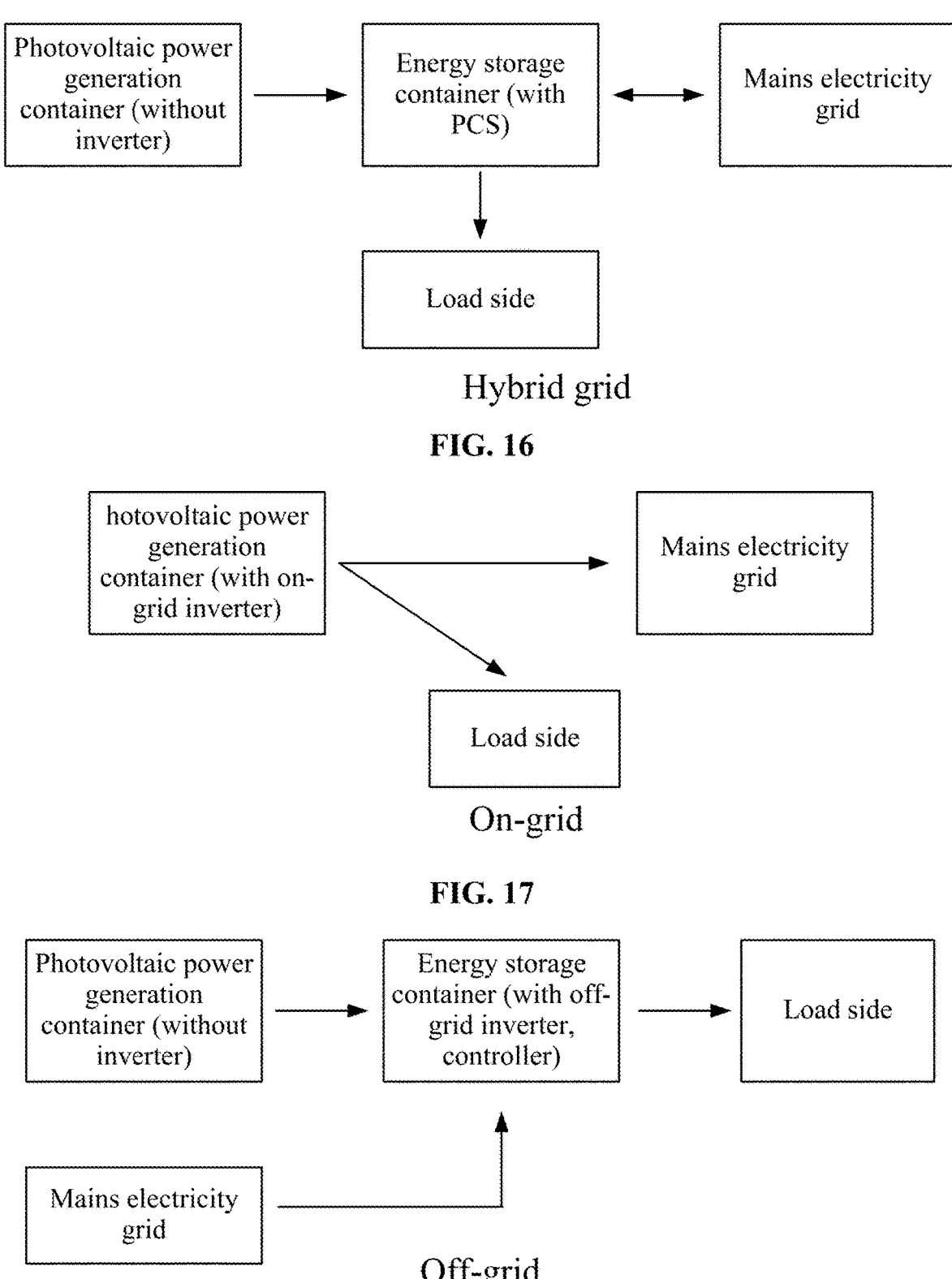
FIG. 16 is a block diagram of a hybrid grid system being one of various application forms of the present disclosure.
FIG. 17 is a block diagram of an on-grid system being one of various application forms of the present disclosure.
FIG. 18 is a block diagram of an off-grid system being one of various application forms of the present disclosure.

FIG. 16 is a schematic diagram of a power generation hybrid-grid mode according to the present disclosure. As shown in FIG. 16, after installation of mechanical structure and electrical connection of components of the solar photovoltaic power generation container finishes, the power generated through solar radiation is conveyed to the energy storage container through cables, and the process control system (PCS) equipped in the energy storage container will give priority to supplying DC electricity produced photovoltaically to the energy storage batteries equipped in the container for discharging of the batteries. The load is connected to the energy storage container through cables, and the load here is supplied power by the energy storage batteries in the energy storage container. When the energy storage batteries are fully charged, the control system will switch from an energy storage battery charging mode to an on-grid mode, and in this case, the DC electricity generated photovoltaically is transformed to AC electricity through the PCS system, to transmit power to the grid.

FIG. 17 is a block diagram of a power generation on-grid mode according to the present disclosure. As shown in FIG. 17, after installation of mechanical structure and electrical connection of components of the solar photovoltaic power generation container finishes, the power generated through solar radiation is transmitted to the inverters, the control system in the inverters will give priority to supplying power in response to the power consumption demand on the load side, and dynamically allocates the amount of electricity supplying to the mains electricity based on the load situation, and the inverters convert the DC power generated photovoltaically into AC power to supply the power to the power consumption side and on-grid end.

FIG. 18 is a block diagram of a power generation off-grid mode according to the present disclosure. As shown in FIG. 18, after installation of mechanical structure and electrical connection of components of solar photovoltaic power generation container, energy storage container, mains electricity and load finishes, the power generated by the modules through solar radiation is transmitted through cables to the energy storage container, the off-grid inverters and control system in the energy storage container convert DC power generated photovoltaically to the AC power used by the load side. When the solar photovoltaic power generation container does not generate power photovoltaically and the batteries in the energy storage container have insufficient power, the mains electricity grid supplies power to the load while charging the batteries in the energy storage container through the inverters and controller built in the energy storage container.

Figure 19:
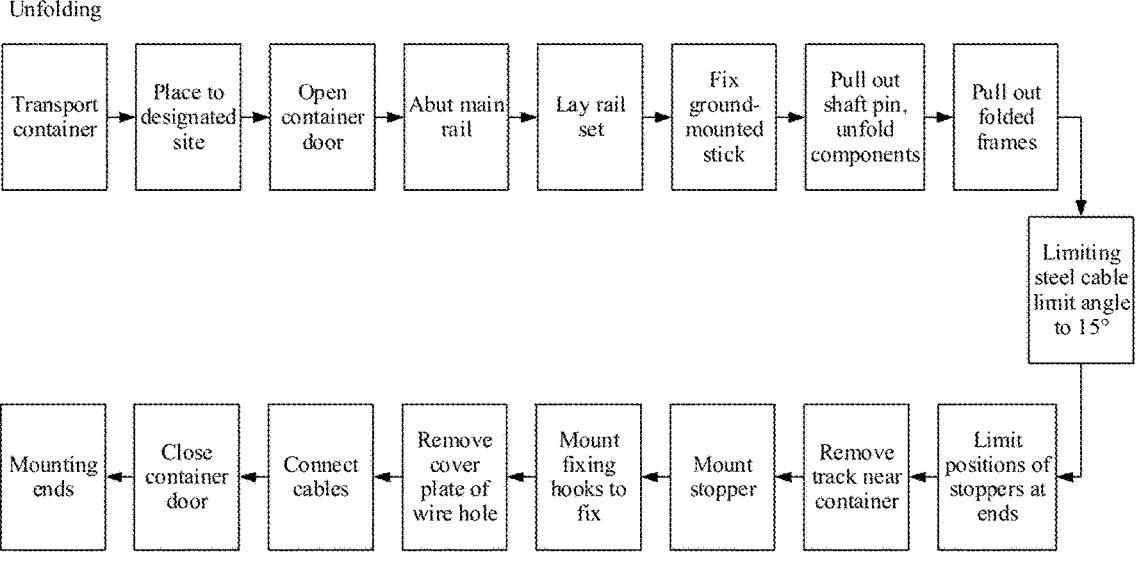
FIG. 19 is a block diagram showing the workflow of unfolding the container according to the present disclosure.

As shown in FIG. 19, a method for unfolding a foldable portable solar photovoltaic array power generator set container is provided according to this embodiment, the method includes the following operations.

A container 4 is placed in a designated site after being transported.

A door of the container 4 is opened, two lower latch square tubulars 43 at a lower part of the foldable solar photovoltaic power generation unit are taken out and placed below the folded solar photovoltaic power generation unit 1. Two lower latch square tubulars 43 are synchronously jacked by using four jacks to take out four battens, to allow a caster 153 of the foldable solar photovoltaic power generation unit 1 to fall on a lower track 44. The rail component 2 in the container 4 is laid outwards, a transfer track 24 is laid first, and then track racks 22 and tracks 21 are laid.

A latch for fixing the foldable solar photovoltaic power generation unit 1 is drawn out, and the foldable solar photovoltaic power generation unit 1 is unfolded.

Folded frames 11 are pulled out, to allow an angle limiting steel cable 121 to limit an angle of the folded frames 11 with respect to the track 21 to 15 degrees.

After the folded solar photovoltaic power generation unit 1 is unfolded in place, blocking plates 224 are mounted to head and tail ends of the rail component 2 respectively, to limit positions of two sets of frames 11 at the head and tail ends.

A transfer track 24 near the container 4 is removed.

S-shaped fixing hooks 225 are mounted to fix two sets of frames 11 at the head and tail ends. A cover plate of a wire hole 41 is removed, power cables 34 of the foldable solar photovoltaic power generation unit 1 are passed through the wire hole 41 and the power cables 34 are connected to inverters 31.

Each switch of electrical equipment 3 is turned on, the door of the container 4 is closed after power generation is performed normally, and the installation ends.

Figure 20:
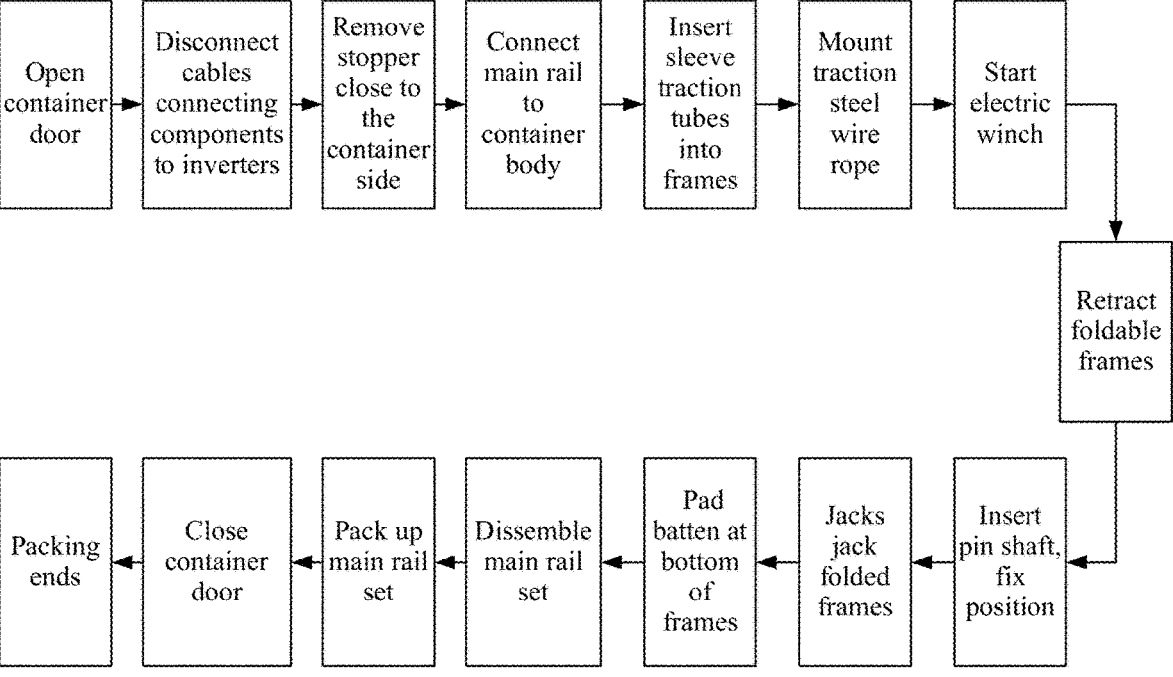
FIG. 20 is a block diagram showing the workflow of packing and transferring of the container according to the present disclosure.

As shown in FIG. 20, a method for transferring a foldable portable solar photovoltaic array power generator set container is provided according to an embodiment of the present disclosure, which includes as follows.

A door of a container 4 is opened, each switch of electrical equipment 3 is turned off, power cables 34 by which the foldable solar photovoltaic power generation unit 1 is connected to inverters 31 are disconnected and pulled out, and the power cables 34 are drawn out from a wire hole 41.

A cover plate of the wire hole 41 is mounted in a side door of the container 4, and a transfer track 24 is used to connect a track 21 to the container 4.

Sleeve traction tubes are inserted into frames 11 and a traction steel wire rope is installed.

An electric winch is started, to pack the frames 11 into the container 4, an upper pin is inserted to fix and limit the position.

Pearl cotton is laid on front, left and right sides of the foldable solar photovoltaic power generation unit 1, and three tightening bandages are tied on the foldable solar photovoltaic power generation unit 1 to tighten the foldable solar photovoltaic power generation unit 1.

Two lower latch square tubulars 43 are placed below the foldable solar photovoltaic power generation unit 1, and four jacks are used to contact the two lower latch square tubulars 43 to jack up the foldable solar photovoltaic power generation unit 1, and four battens are placed evenly below the foldable solar photovoltaic power generation unit 1. Specifically, two of the four battens are respectively placed at two sides of the foldable solar photovoltaic power generation unit 1, the jacks are lowered to allow the foldable solar photovoltaic power generation unit 1 to press onto the four battens. Two lower latch square tubulars 43 are inserted into the squares at a lower part of lateral sides of the frames 11 by bolts.

A disassembled rail component 2 is packed into the container 4 and is fixed.

After the door of the container 4 is closed, the container 4 is packed and transferred by a truck mounted crane.

In summary, the following technical effects are achieved through the present disclosure.

The solar photovoltaic array according to the present disclosure is integrated in the container, the integrated modularity is high, the transportation is convenient, and the installation is simple.

In the present disclosure, galvanized square tubes are used to form the foldable frames by welding, the photovoltaic components are mounted on the foldable frames. A hinge is welded to the top of the frames 11 for performing the folding, and industrial casters are installed at the bottom of the frames 11 to facilitate the unfolding and translating of the frames 11. Every two frames 11 form a set, and the two frames 11 in each set are connected by using a steel wire rope to form a triangle, which not only fixes the frames, but also limit the angle to 15 degrees, and a suspending steel cable 122 with one end being of a safe quick hanging buckle and the other end being of an annular squeeze head is used. The annular squeeze head end is fixed onto an upper part of the frame 11 by using a tapping screw, and the safe quick hanging buckle end is buckled to the angle limiting steel cable 121, and the position-limiting steel cable can be retracted when to retract the foldable frames, so that the position-limiting steel cable will not fall onto the ground. The "H" type stoppers are mounted at head and tail ends of the rail component 2, serving as position limiters of the foldable frames 11 in the length direction. The S-shaped fixing hooks 225 are used to fix the foldable frames 11, so that the position of the foldable frames 11 can be fixed without being displaced caused by external factors.

When to generate power by the present disclosure, it simply requires an open ground or space. After the container is transported in place, simply unfolding the folded unit, power generation may just be performed. When to remove the power station to other places due to various reasons such as weather, site expiration, and planning changes, it is simply required to fold the foldable unit and put it back to the container, and then transport the container to a new site, the power station may just be reinstalled and used. The installed foldable solar photovoltaic power generation unit can be directly used in an on-grid manner, and may also be used in an off-grid manner by combining with energy storage container, so the application scenario is very broad, the installation is convenient and the transportation is facilitated, which breaks the constraints of common ground power stations and distributed power stations that can hardly move geographically, meets the requirements of applications in various environments and has better portability.

What is claimed is:

1. A portable solar photovoltaic array power generator set container, comprising a container, a foldable solar photovoltaic power generation unit capable of being packed inside the container, a rail component for the foldable solar photovoltaic power generation unit to travel and electrical equipment; and the foldable solar photovoltaic power generation unit comprises a plurality of frames, a plurality of solar photovoltaic components fixed in each of the frames, a hinge component and a movable component;

wherein one set of frames are formed by every two frames, the hinge component is connected to upper ends of the one set of frames where the frames are connected, to enable the one set of frames to be folded;

wherein the movable component is arranged at a lower end of each of two sides of the one set of frames, and the movable component is foldable with another set of frames and is configured to travel along the rail component;

wherein the foldable solar photovoltaic power generation unit further comprises a position-limiting component for limiting an unfolding angle of each set of frames;

wherein the movable component comprises a C-shaped large frame fixedly connected to a lower end of a set of frames, a C-shaped small frame fixedly connected to a lower end of another set of frames and a caster;

wherein the C-shaped small frame is located inside the C-shaped large frame, the caster is located inside the C-shaped small frame, and an axle bolt is configured to connect and fix the C-shaped small frame, the C-shaped large frame and the caster;

wherein a sleeve tube is mounted between the C-shaped large frame and the C-shaped small frame for supporting, and a position-limiting eye nut is arranged on an outer side of the C-shaped large frame; and wherein the caster is arranged on a track of the rail component to travel in a rolling manner.

2. The portable solar photovoltaic array power generator set container according to claim 1, wherein each frame is provided with a plurality of stringers to divide one frame into a plurality of component mounting positions, each of the component mounting positions is provided with a top blocking plate and a component mounting and fixing piece, and the plurality of solar photovoltaic components are fixed to the top blocking plate and the component mounting and fixing piece by bolts.

3. The portable solar photovoltaic array power generator set container according to claim 1, wherein the position-limiting component comprises an angle limiting steel cable, each of two ends of the angle limiting steel cable is provided with a position-limiting ring, the movable component is provided with a position-limiting eye nut, and two position-limiting rings are fixed to two position-limiting eye nuts of the one set of frames, respectively, to limit the unfolding angle of the one set of frames.

4. The portable solar photovoltaic array power generator set container according to claim 3, wherein the position-limiting component further comprises a suspending steel cable, an upper end of the suspending steel cable is provided with a fixed head, and the fixed head is fixed to a top of a set of frames, a lower end of the suspending steel cable is provided with a pull ring, and the angle limiting steel cable is arranged to pass through the pull ring.

5. The portable solar photovoltaic array power generator set container according to claim 4, wherein each of head and tail ends of the rail component is provided with an axle bolt, a blocking plate and an S-shaped fixing hook, a caster of each of two sets of frames at the head and tail ends moves into the blocking plate, the axle bolt moves to be stuck into a stopping groove of the blocking plate, a first end of the S-shaped fixing hook hooks the blocking plate, and a second end of the S-shaped fixing hook hooks the axle bolt, to limit and fix positions of the two sets of frames at the heat and tail ends.

6. The portable solar photovoltaic array power generator set container according to claim 5, wherein the rail component comprises a plurality of sections of tracks and track racks and U-shaped latches, every two sections of tracks are fixed to a track rack by a U-shaped latch, and the movable component is arranged on the track to roll.

7. The portable solar photovoltaic array power generator set container according to claim 6, wherein each track rack comprises a ground-mounted plate, the ground-mounted plate is fixed onto the ground by ground-mounted sticks, the ground-mounted plate is connected and fixed to the track rack by bolts, and the track is fixed onto the track rack.

8. The portable solar photovoltaic array power generator set container according to claim 1, wherein the electrical equipment is configured in the container, the electrical equipment comprises a plurality of inverters, energy storage batteries, a power distribution box and power cables;

wherein the plurality of solar photovoltaic components, after being connected in series and in parallel by the power cables, are connected to the plurality of inverters respectively, and the energy storage batteries, after being connected in series and in parallel by the power cables, are connected to the plurality of inverters, each of the inverters is connected to the power distribution box by a power cable;

wherein the electrical equipment electrically connects the foldable solar photovoltaic power generator unit to form a power generation circuit, and the power generation circuit is connected to a load to supply power.

9. The portable solar photovoltaic array power generator set container according to claim 8, wherein a wire hole is configured at a side door of the container, inside the container, the container comprises a hanger rod, a latch square tubular, a lower track, and a wall-mounted track, the hanger rod and the latch square tubular are welded and fixed to a top portion at an inner side of the container, and the lower track is welded and fixed to a bottom portion at the inner side of the container, the wall-mounted track is a porous track, and is welded and fixed onto an inner wall of the container.

10. The portable solar photovoltaic array power generator set container according to claim 9, wherein the rail component further comprises a transfer track, the foldable solar photovoltaic power generation unit, after being folded and retracted, is pushed onto the lower track inside the container via the transfer track, and the foldable solar photovoltaic power generation unit is fixed onto the latch square tubular by a latch;

wherein each of the inverters, the energy storage batteries and the power distribution box is mounted and fixed to the wall-mounted track by a bolt, the power cables pass through the wire hole to electrically connect the plurality of solar photovoltaic components to the plurality of inverters.

11. An operation method for unfolding a foldable portable solar photovoltaic array power generator set container, comprising:

placing a container, after being transported, in a designated site;

opening a door of the container, taking out two lower latch square tubulars at a lower part of a foldable solar photovoltaic power generation unit of the foldable portable solar photovoltaic array power generator set container and placing the two lower latch square tubulars below the folded solar photovoltaic power generation unit, and synchronously jacking the two lower latch square tubulars by using four jacks to take out four battens, to allow a caster of the foldable solar photovoltaic power generation unit to fall on a lower track, laying a rail component in the container outwards, laying a transfer track first, and then laying track racks and tracks;

drawing out a latch for fixing the foldable solar photovoltaic power generation unit, and unfolding the foldable solar photovoltaic power generation unit;

pulling out folded frames, to allow an angle limiting steel cable to limit an angle of the folded frames with respect to the tracks to 15 degrees;

after the folded solar photovoltaic power generation unit is unfolded in place, mounting blocking plates to head and tail ends of the rail component respectively, to limit positions of two sets of frames at the head and tail ends;

removing the transfer track closest to the container;

mounting S-shaped fixing hooks to fix the two sets of frames at the head and tail ends;

removing a cover plate of a wire hole, and passing power cables of the foldable solar photovoltaic power generation unit through the wire hole and connecting the power cables to inverters; and turning on each switch of electrical equipment, closing the door of the container after power generation is performed normally, and ending an installation, wherein the foldable solar photovoltaic power generation unit comprises a movable component, wherein the movable component comprises a C-shaped large frame fixedly connected to a lower end of a set of frames, a C-shaped small frame fixedly connected to a lower end of another set of frames and a caster, wherein the C-shaped small frame is located inside the C-shaped large frame, the caster is located inside the C-shaped small frame, and an axle bolt is configured to connect and fix the C-shaped small frame, the C-shaped large frame and the caster, wherein a sleeve tube is mounted between the C-shaped large frame and the C-shaped small frame for supporting, and a position-limiting eye nut is arranged on an outer side of the C-shaped large frame, and wherein the caster is arranged on a track of the rail component to travel in a rolling manner.

12. A method for packing and transferring a portable solar photovoltaic array power generator set container, comprising:

opening a door of the container, turning off each switch of electrical equipment, disconnecting and pulling out power cables by which a foldable solar photovoltaic power generation unit of the foldable portable solar photovoltaic array power generator set container is connected to inverters, and drawing out the power cables from a wire hole;

mounting a cover plate of the wire hole in a side door of the container, and using a transfer track to connect a track to the container;

inserting sleeve traction tubes into frames and installing a traction steel wire rope;

starting an electric winch, packing the frames into the container, inserting an upper pin to fix and limit a position;

laying pearl cotton on front, left and right sides of the foldable solar photovoltaic power generation unit, and tying three tightening bandages on the foldable solar photovoltaic power generation unit to tighten the foldable solar photovoltaic power generation unit;

placing two lower latch square tubulars below the foldable solar photovoltaic power generation unit, and using four jacks to contact the two lower latch square tubulars to jack up the foldable solar photovoltaic power generation unit, and placing four battens evenly below the foldable solar photovoltaic power generation unit, wherein two battens are respectively placed at two sides of the foldable solar photovoltaic power generation unit, lowering the jacks to allow the foldable solar photovoltaic power generation unit to press onto the four battens, and inserting two lower latch square tubulars into squares at a lower part of lateral sides of the frames by bolts;

storing a disassembled rail component into the container and fixing the disassembled rail component; and after closing the door of the container, packing and transferring the container by a truck mounted crane, wherein the foldable solar photovoltaic power generation unit comprises a movable component, wherein the movable component comprises a C-shaped large frame fixedly connected to a lower end of a set of frames, a C-shaped small frame fixedly connected to a lower end of another set of frames and a caster, wherein the C-shaped small frame is located inside the C-shaped large frame, the caster is located inside the C-shaped small frame, and an axle bolt is configured to connect and fix the C-shaped small frame, the C-shaped large frame and the caster, wherein a sleeve tube is mounted between the C-shaped large frame and the C-shaped small frame for supporting, and a position-limiting eye nut is arranged on an outer side of the C-shaped large frame, and wherein the caster is arranged on a track of the rail component to travel in a rolling manner.

* * * * *